Oct. 15, 1968

K. A. RUTTENBERG 3,406,400

HIGH RESOLUTION RADAR

Filed May 17, 1967

INVENTOR.
Kenneth A. Ruttenberg
BY
Shenier + O'Connor

ATTORNEYS

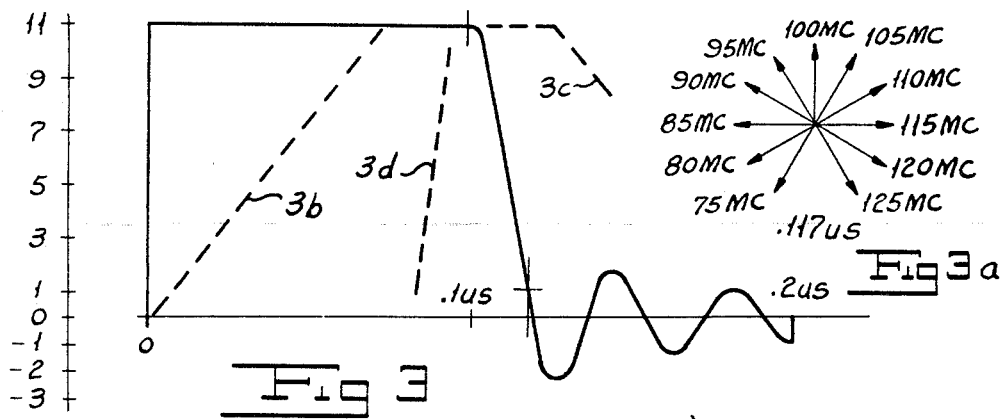
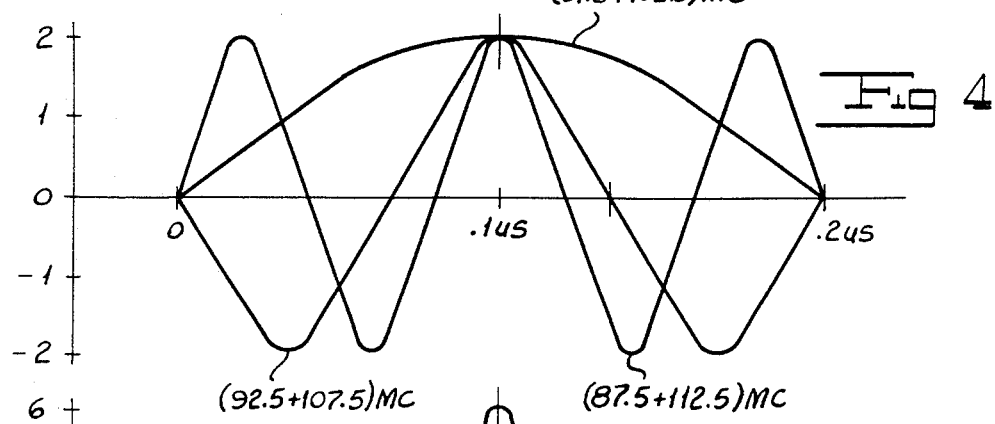
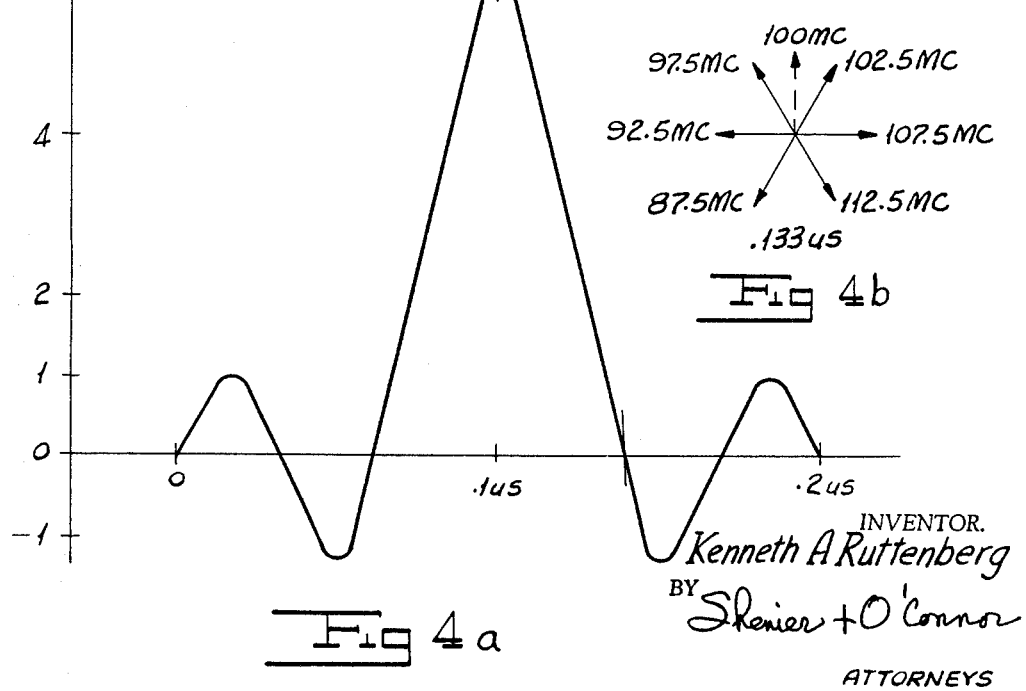

United States Patent Office 3,406,400
Patented Oct. 15, 1968

3,406,400
HIGH RESOLUTION RADAR
Kenneth A. Ruttenberg, Norwalk, Conn., assignor to United Aircraft Corporation, East Hartford, Conn., a corporation of Delaware
Filed May 17, 1967, Ser. No. 639,199
18 Claims. (Cl. 343—17.1)

ABSTRACT OF THE DISCLOSURE

A radar system in which the transmitted frequency is successively changed from pulse to pulse includes a recirculating delay line having a period equal to the time interval between transmitted pulses. This permits the various frequencies to be added together or integrated, despite the fact that they are not transmitted simultaneously. Phase coherence between the various frequencies is preserved at a given instant during the various pulses. The composite pulse in the recirculating delay line will have a high amplitude at the instant of phase coherence and a low amplitude elsewhere. This recirculating pulse is amplitude-modulated. The various side bands for the modulated recirculating pulse are generated successively rather than simultaneously.

Summary of the invention

One object of my invention is to provide a high resolution radar system in which the transmitted frequency is successively changed from pulse to pulse.

Another object of my invention is to provide a high resolution radar in which the various transmitted frequencies are superimposed in a recirculating line having a delay equal to the time interval between transmitted pulses.

Still another object of my invention is to provide a high resolution radar in which phase coherence of the various transmitted frequencies is preserved at a given instant of time.

A further object of my invention is to provide a high range resolution radar system in which the composite pulse in the recirculating delay line is amplitude-modulated and has an extremely small duration of peak amplitude.

Other and further objects of my invention will appear from the following description.

Description of the drawings

In the accompanying drawings which form part of the instant specification and which are to be read in conjunction therewith and in which like reference numerals are used to indicate like parts in the various views:

FIGURE 3 is a graph showing the amplitude and phase of a master pulse in the recirculating delay line for eleven transmitted frequencies.

FIGURE 3a is a graph showing the phase relationships between the various frequencies of FIGURE 3 at a given instant of time.

FIGURE 4 is a graph showing the amplitude and phase of various pairs of side bands for six transmitted frequencies.

FIGURE 4a is a graph showing the amplitude and phase of the modulated pulse in the recirculating delay line.

FIGURE 4b is a graph showing the instantaneous phase relationship between the various frequencies at a given instant of time.

Description of the preferred embodiment

Figure 1:
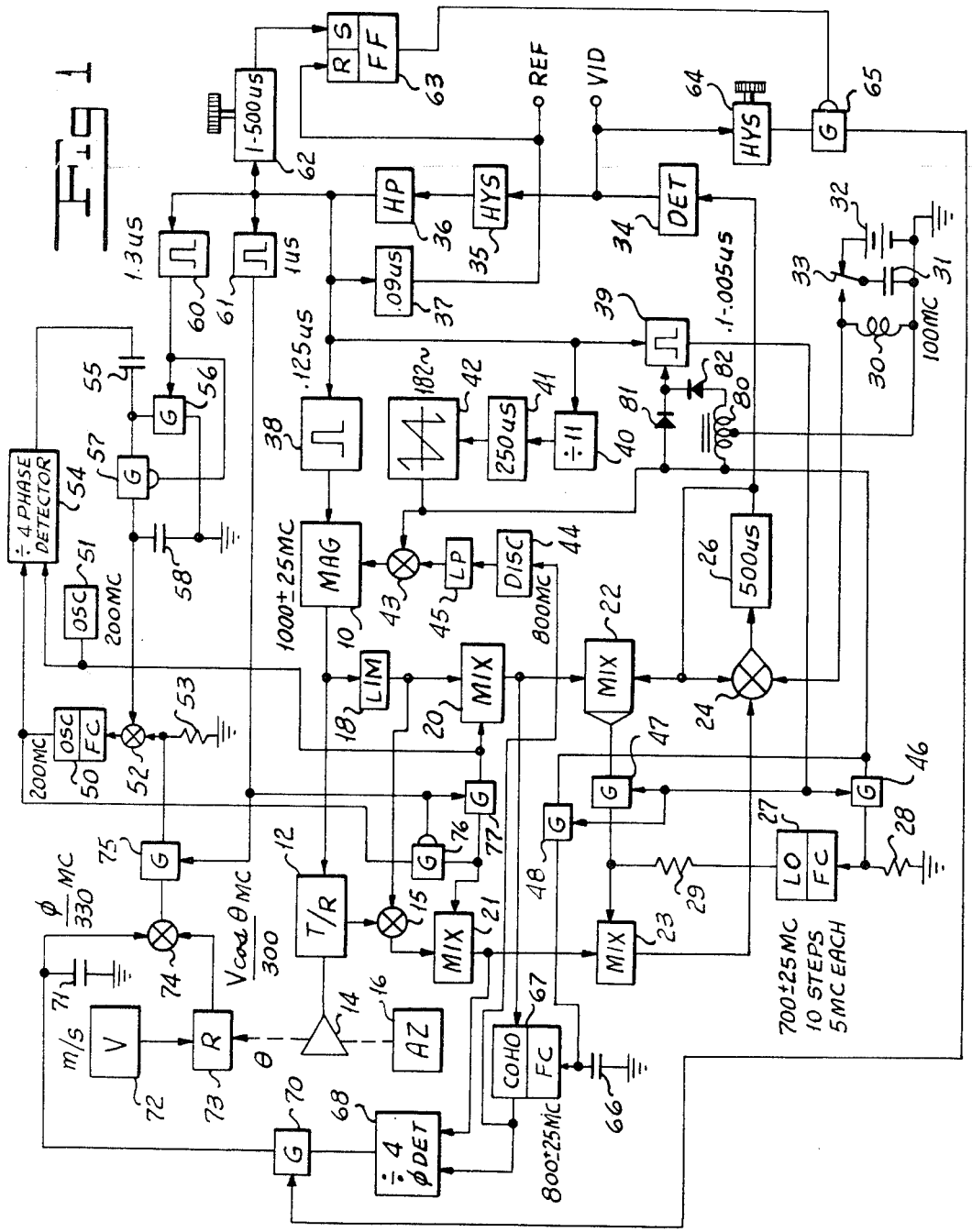
FIGURE 1 is a schematic view showing a preferred embodiment of my invention.

Referring now to FIGURE 1 of the drawings, the output of a magnetron 10 is coupled to a transmit-receive tube 12. Tube 12 is coupled to an antenna 14, which is oscillated or rotated in azimuth by a mechanism 16. The output of magnetron 10 is applied through a limiter 18 to one input of a mixer 20 and an adding circuit 15. Tube 12 is coupled to a second input of adding circuit 15. The output of a stable 200 mc. oscillator 51 is applied to a second input of mixer 20 and is coupled through a gate 77 to a second input of mixer 21. The outputs of mixers 20 and 21 are coupled to respective mixers 22 and 23. Mixer 22 provides a very low impedance output which is coupled through gate 47 to mixer 23. The output of mixer 23 is coupled to a summing amplifier 24, the output of which is applied to a 500 microsecond delay line 26. The output of delay line 26 is applied to a second input of summing amplifier 24 and to the second input of mixer 22. The output of delay line 26 is coupled to a detector 34 which provides the video output. The output of detector 34 is applied to a hysteresis or voltage delay circuit 35. The output of hysteresis circuit 35 is applied to a high-pass filter or differentiating circuit 36. The output of differentiating circuit 36 is applied to a generator 38 which provides pulses of .125 microsecond duration. The output of pulse generator 38 is coupled to magnetron 10. The output of differentiating circuit 36 is further coupled to a divide-by-eleven ring counter 40 and to a generator 39 which normally provides pulses of .1 microsecond duration. The output of ring counter 40 is coupled through a 250 microseconds delay line 41 to the synchronizing or retrace input of a 182 cycle sawtooth generator 42. The output of sawtooth generator 42 is coupled through an adding network 43 to the frequency control input of magnetron 10. The output of a 700 mc. local oscillator 27 is coupled through a resistor 29 to the output of gate 47. Oscillator 27 is provided with a frequency control input which is grounded through a resistor 28. The output of sawtooth generator 42 is coupled through a gate 46 to the frequency control input of oscillator 27 and is further coupled through a gate 48 to the frequency control input of an 800 mc. coherent oscillator 67. The frequency control input of oscillator 67 is grounded through a capacitor 66. The output of pulse generator 39 simultaneously enables gates 46, 47, and 48. The output of sawtooth generator 42 is coupled to the anode of a rectifier 81 and to one terminal of a winding 80 which is provided with a grounded center tap. The other terminal of winding 80 is connected to the anode of a rectifier 82. The cathodes of rectifiers 81 and 82 are coupled to a control input of generator 39, which shortens the duration of pulses by as much as .005 microsecond. Components 80, 81, and 82 comprise a full-wave rectifier so that the pulse duration of generator 39 is shortened by an amount proportional to the absolute value of the output of sawtooth generator 42 irrespective of whether it is positive or negative.

One terminal of an inductor 30 and of a capacitor 31 are grounded. The other terminal of capacitor 31 is connected to the armature of a single-pole double-throw switch 33. One contact of switch 33 is connected to the other terminal of inductor 30 and to a further input of summing amplifier 24. The other contact of switch 33 is connected to the positive terminal of a battery 32, the negative terminal of which is grounded. Inductor 30 and capacitor 31 are tuned to resonate at 100 mc. The output of oscillator 67 is applied to an 800 mc. discriminator 44, the output of which is applied through a low-pass filter 45 to another input of adding network 43. The output of a 200 mc. oscillator 50 is coupled through a gate 76 to the output of gate 77. The outputs of oscillators 50 and 51 are applied to a divide-by-four phase detector 54. As will be appreciated by those having ordinary skill in the art, phase detector 54 provides a substantially linear sawtooth output as the phase between its two inputs varies between ±180°. The output of phase detector 54 is coupled to one terminal of a capacitor 55. The other terminal of capacitor 55 is connected through a gate 56 to ground and through a gate 57 to one terminal of a capacitor 58, the other terminal of which is grounded. The output of gate 57 is coupled through an adding network 52 to the frequency control input of oscillator 50. The second input of adding network 52 is grounded through a resistor 53. The output of differentiating circuit 36 is applied to a 1.3 microseconds pulse generator 60 and to a 1 microsecond pulse generator 61. The output of pulse generator 60 simultaneously enables gate 56 and disables gate 57.

The output of mixer 20 synchronizes coherent oscillator 67. The outputs of oscillator 67 and of mixer 21 are applied to a divide-by-four phase detector 68 which may be similar to phase detector 54. The output of phase detector 68 is coupled through a gate 70 to one input of an adding network 74. The output of gate 70 is grounded through a capacitor 71.

My radar system may be mounted either on the ground or upon a moving aircraft. Assuming for the moment that my system is mounted on an aircraft, the azimuth control mechanism 16 provides the angle $\theta$ which relates the position of the antenna to the heading axis of the craft. Azimuth control 16 drives the rotor of a resolver 73 synchronously with antenna 14. The aircraft is provided with a ground speed meter 72 which provides velocity V in, for example, meters per second. The output of ground speed meter 72 is applied to the stator of resolver 73. The rotor output of resolver 73 is applied to a second input of adding network 74, the output of which is coupled through a gate 75 to the second input of adding network 52. The output of pulse generator 61 enables gates 75 and 77 and disables gate 76.

The output of differentiating circuit 36 is applied to a manually adjustable delay network 62 and to a .09 microsecond delay network 37. The output of delay network 37 provides a reference pulse which is coupled to the resetting input of a bistable flip-flop 63. Delay line 62 is manually adjustable between 1 and 500 microseconds; and its output is applied to the setting input of flip-flop 63. The video output of detector 34 is applied to a manually adjustable hysteresis or voltage delay circuit 64. The output of hysteresis circuit 64 is coupled through a gate 65 to enable gate 70. The output of flip-flop 63 is applied to inhibit gate 65.

In operation of my invention, the armature of switch 33 is initially in the position shown where capacitor 31 is charged by battery 32. To initiate the generation of transmitted pulses, the armature of switch 33 is moved into engagement with inductor 30, where the resonant circuit comprising inductor 30 and capacitor 31 provides a 100 mc. pulse which is coupled through summing amplifier 24 into recirculating delay line 26. Once a master pulse has been introduced into the delay line, the armature of switch 33 may be left in engagement with inductor 30 or may be returned to engagement with battery 32. The starting pulse from components 30 and 31 decays exponentially. However, it will be subsequently shown that the master pulse in the recirculating delay line assumes the form shown in FIGURE 3 after operation of the circuit has stabilized. The leading edge of the master pulse from delay line 26 actuates pulse generator 38 through detector 34, hysteresis circuit 35, and differentiating circuit 36; and pulse generator 38 triggers magnetron 10. The output frequency of magnetron 10 varies from 975 mc. to 1025 mc. in ten steps of 5 mc. each under the control of sawtooth generator 42. Accordingly, the output of mixer 20 will similarly vary from 775 mc. to 825 mc. During each transmitted pulse, gate 77 is enabled and gate 76 is disabled, so that the output of oscillator 51 is simultaneously impressed upon mixers 20 and 21. Accordingly, during the transmitted pulse, the outputs of mixers 20 and 21 are identical. Since the magnetron is triggered by the leading edge of the master pulse from the recirculating delay line 26, the leading edge of the magnetron pulse from mixer 20 and the leading edge of the master pulse from the recirculating delay line 26 arrive at mixer 22 in substantial time coincidence. The output of mixer 22 will vary between 675 mc. and 725 mc. Magnetron 10 provides pulses of .2 microsecond duration. During the first .1 microsecond of the transmitted pulse, that is, during the first half of the transmitted pulse, gate 47 is enabled to pass the output of mixer 22 to mixer 23. Also during the first half of each transmitted pulse, gate 46 is enabled to couple the output of sawtooth generator 42 to the frequency control input of oscillator 27, so that oscillator 27 is tuned substantially to the output frequency of mixer 22. The output of oscillator 27 will thus also vary from 675 mc. to 725 mc. Mixer 22 has a low output impedance; and oscillator 27 has a fairly high output impedance. Furthermore, when gate 47 is enabled, the output of mixer 22 is decoupled from the output of oscillator 27 by resistor 29. Thus, during the first half of each transmitted pulse, mixer 23 receives the output of mixer 22 irrespective of the output of oscillator 27. However, during the first half of each transmitted pulse, the output of mixer 22 is applied through resistor 29 to the output of oscillator 27 to synchronize the oscillator to precisely the output frequency and phase of mixer 22. During the first half of each transmitted pulse, the output of mixer 23 is a 100 mc. signal which is precisely in phase with the 100 mc. master pulse input to mixer 22 from the delay line, since mixers 22 and 23 receive identical signals from mixers 20 and 21. Accordingly, during the first half of each transmitted pulse, the 100 mc. master pulse in the delay line is reinforced by the synchronous output from mixer 23. In FIGURE 3, it will be noted that from 0 to .1 microsecond the amplitude of the recirculating master pulse is constant at a value of 11.

At the midpoint of each transmitted pulse, gates 46 and 47 are disabled. Resistor 28 returns the frequency control input of oscillator 27 to ground potential, so that oscillator 27 now provides a stable output frequency of 700 mc. At this instant, the output of oscillator 27 exhibits an abrupt change of frequency but no change in phase. It will be appreciated by those ordinarily skilled in the art that phase angle is the time integral of frequency. Accordingly, at the midpoint of each transmitted pulse, oscillator 27 undergoes a frequency discontinuity but no phase change. During the last half of the various transmitted pulses, the output of mixer 23 will vary from 75 mc. to 125 mc. The superposition of these various side-band frequencies results in a master pulse in the recirculating delay line of the form shown in FIGURE 3, wherein the amplitude of the composite pulse during the last half drops rapidly towards and oscillates about zero.

FIGURE 3a shows the instantaneous phase relationships between the eleven frequencies at .117 microsecond. It will be noted that the various pairs of sideband components (such as 95 mc. and 105 mc.) combine to produce a resultant which is either in phase or out of phase with the 100 mc. carrier. At the instant shown, all sideband components cancel, leaving as a resultant only the 100 mc. component having an amplitude of unity.

Figure 2:
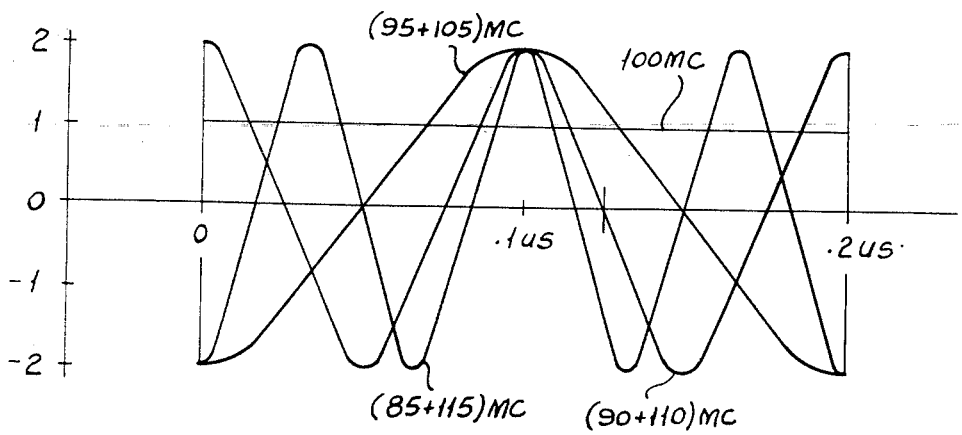
FIGURE 2 is a graph showing the amplitude and phase of the carrier and various pairs of side bands for seven transmitted frequencies.

Referring now to FIGURE 2, there is shown superposed the various sequential outputs of mixer 23 for received signals from a reflecting target, wherein zero on the time axis refers to the instant when the leading edge of each pulse is received. This superposition is of course effected by the recirculating delay line. It is assumed that only seven frequencies are transmitted. The 100 mc. component has a constant amplitude of unity. The 95 mc. and 105 mc. components are combined to produce a sinusoidal amplitude variation which is either in phase or out of phase with the 100 mc. carrier. During the .2 microsecond duration of the received pulse, these components pass through one cycle of amplitude variation. The 90 mc. and 110 mc. components are similarly combined to produce two cycles of amplitude variation during the course of a received pulse; and the 85 mc. and 115 mc. components are combined to produce a resultant which exhibits three cycles of amplitude variation during the course of a received pulse. The three pairs of side-band components each have a peak amplitude of 2. It will be noted that at .1 microsecond the three pairs of side-band components are in phase.

Figure 2B:
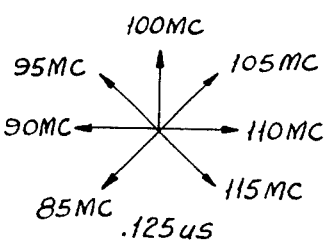
FIGURE 2b is a graph showing the instantaneous phase relationships between the various frequencies at a given instant of time.
Figure 2A:
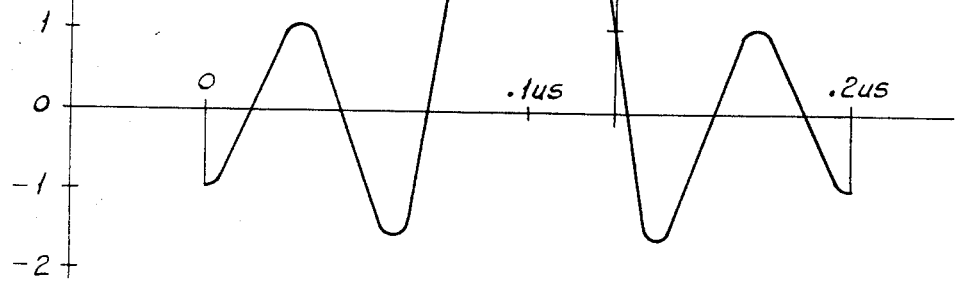
FIGURE 2a is a graph showing the amplitude and phase of the resultant modulated pulse in the recirculating delay line.

In FIGURE 2a, the three pairs of side-band components in addition to the 100 mc. carrier have been combined to show the resultant pulse in the recirculating delay line corresponding to a target. It will be noted that the received pulse exhibits a peak amplitude of 7 at .1 microsecond; and the amplitude rapidly decays both before and after towards a value which oscillates about zero. The output of detector 34 is of course insensitive as to whether the phase of the amplitude-modulated pulse of FIGURE 2a is positive or negative. Accordingly, the envelope shown in FIGURE 2a is rectified in detector 34.

FIGURE 2b shows the instantaneous phase relationship between the various frequency components at .125 microsecond. From FIGURE 2b it will be noted that the various pairs of side-band components combine to produce a resultant which is either in phase or out of phase with the 100 mc. carrier. It will be noted from FIGURES 2, 2a, and 2b that all side-band components cancel at .125 microsecond, leaving as a resultant only the 100 mc. carrier having an amplitude of unity. The waveforms of FIGURES 2, 2a and 2b would obtain if the ring counter 40 of FIGURE 1 were provided with only seven stages instead of eleven and if the gain of sawtooth generator 42 were correspondingly reduced to provide a maximum magnetron deviation of ±15 mc.

FIGURE 4 shows the amplitude and phase relations of each of the three pairs of side bands where only six frequencies are transmitted. In FIGURE 4, the 97.5 mc. and 102.5 mc. components combine to produce one half cycle of amplitude variation during the course of a received pulse. The 92.5 mc. and 107.5 mc. components combine to produce three half cycles of amplitude variation during the course of a received pulse; and the 87.5 mc. and 112.5 mc. components combine to produce a resultant which exhibits five half cycles of amplitude variation during the course of a received pulse. The three pairs of combined side bands are in phase at .1 microsecond.

The FIGURE 4a shows the resultant received pulse in the recirculating delay line. It will be noted that the received pulse has a peak amplitude of 6 at .1 microsecond.

If the length of the transmitted pulses were doubled to .4 microsecond, then the curves of FIGURES 2 and 2a would be extended to the right. In FIGURE 2, the three pairs of side bands would again be in phase at .3 microsecond; and in FIGURE 2a the envelope would exhibit another positive peak having an amplitude of +7 at .3 microsecond. In FIGURE 4, the three pairs of side bands would be in phase at .3 microsecond; and in FIGURE 4a the envelope would exhibit a negative peak having an amplitude of −6 at .3 microsecond. It will be appreciated that the use of such a long transmitted pulse would be disadvantageous, since each target would produce a pair of peak responses where the transmitting frequency is stepped between pulses by 5 mc. For a transmitted pulse duration of .2 microsecond, the optimum frequency step in the transmitter output is 5 mc.

Where an odd number of frequencies are transmitted as in FIGURE 2a, the envelope repeats in both amplitude and phase for each .2 microsecond interval, assuming the envelope is extended in time as for long transmitted pulses. However, where an even number of frequencies are transmitted as in FIGURE 4a, the envelope repeats in amplitude during successive .2 microsecond intervals but reverses in phase. Accordingly, where an even number of frequencies are transmitted as in FIGURE 4a, a full cycle of envelope variation requires .4 microsecond. During a full .4 microsecond period, where both positive and negative peaks occur, then no 100 mc. component will appear, since its amplitude will precisely integrate to zero. However, where the pulse duration is one-half cycle or .2 microsecond, the envelope of FIGURE 4a will contain an appreciable half-cycle rectification component at a frequency of 100 mc. even though this frequency is never transmitted.

It will be noted from FIGURE 4 that each of the three pairs of side bands produces an odd number of half cycles of amplitude variation during the course of a received pulse. Accordingly, each pair of side bands produces a net 100 mc. rectification component over the pulse duration period of .2 microsecond. The net 100 mc. rectification component for the first pair of side bands is $4/\pi$. The net 100 mc. rectification component for the second pair of side bands is $4(-1/3)/\pi$. The net 100 mc. rectification component for the third pair of side bands is $4(1/5)/\pi$. The total 100 mc. rectification component for the three pairs of side bands is thus $4(1-1/3+1/5)/\pi = 1.103$. If the number of pairs of side bands is increased without limit, then $(1-1/3+1/5-1/7+1/9-\ldots) = \pi/4$; and the total 100 mc. rectification component approaches unity.

FIGURE 4b shows the instantaneous phase relationship between the six wide bands at .133 microsecond. The half-cycle rectification 100 mc. component is shown by the broken line to have a 1.103 amplitude. It will be noted that the upper side bands are phase advanced relative to the 100 mc. rectification component, while the three lower side bands are phase retarded relative to the 100 mc. rectification component. At the instant shown, the various side bands have a resultant amplitude of zero, as may be seen by reference to FIGURES 4, 4a, and 4b.

The recirculating master pulse of the form shown in FIGURE 3 calibrates the system for phase shifts in magnetron 10 and in the local oscillator 51 and for phase shifts resulting from the fact the carrier frequency in the delay line 26 will rarely be such that the product of such frequency and the time delay of the line is precisely an integral number of cycles. Accordingly, the system is compensated at the time of transmission so that reflected signals from all stationary targets will arrive in phase coincidence at the midpoint of the received pulse. However, this phase coincidence will be impaired if any target displacement occurs between transmitted pulses, unless a compensating phase shift is introduced into the system.

If the system is mounted on an aircraft, then the velocity of the system relative to stationary targets on the ground will be V cos θ, where V is aircraft velocity and θ is the angle between the antenna and the heading axis of the craft. For an average transmitted frequency of 1000 mc. the wave length is .3 meter, which corresponds to one cycle or 360 electrical degrees. In a radar system, however, the distance between antenna and target is traversed twice, so that a change in target distance of only .15 meter produces a phase shift of 360 electrical degrees which corresponds to one cycle. For 500 microseconds between pulses, the pulse repetition rate is 2 kc.; and a target motion of .15 meter per pulse corresponds to a velocity of 300 meters per second.

The master triggering pulse from differentiating circuit 36 is coupled to pulse generator 61 which enables gate 75 for a period of 1 microsecond. The velocity signal from resolver 73 is coupled through adding circuit 74 and gate 75 to resistor 53, where it is coupled through adding circuit 52 to the frequency control of oscillator 50. Oscillator 50 is thus shifted from its normal frequency of 200 mc. for a time period of 1 microsecond. It is desired that the phase shift developed in oscillator 50 during the 1 microsecond period of actuation of gate 75 be equal to the phase shift produced by target displacement between successive pulses. The phase shift developed in oscillator 50 is equal to the frequency shift from 200 mc. multiplied by the time of actuation of gate 75. Accordingly, the output of resolver 73 should produce a frequency shift in oscillator 50 from 200 mc. of $V \cos \theta/300$ mc. Thus, if $V \cos \theta = 300$ meters per second, the phase shift in the received signal for each pulse will be 360°. Correspondingly, the frequency shift in oscillator 50 will be 1 mc., since the product of 1 mc. and 1 microsecond is one cycle or 360°. With each transmitted pulse, the phase of oscillator 50 is shifted relative to oscillator 51 during a 1 microsecond period by an amount which is equal to the phase shift in received signals due to aircraft motion between pulses. It is now desired that until the next transmitted pulse, the phase of oscillator 50 relative to oscillator 51 remain constant. Gate 56 is grounded for 1.3 microseconds after each transmitted pulse. The frequency of oscillator 50 returns to 200 mc. 1 microsecond after each transmitted pulse. This gives a time period of .3 microsecond for the output of phase detector 54 to stabilize at its new value and charge capacitor 55 to a corresponding voltage. After 1.3 microseconds from each transmitted pulse, gate 56 is disabled; and gate 57 is enabled to impress any changes in the output of phase detector 54 upon capacitor 58 through the capacitive voltage divider comprising capacitors 55 and 58. Any change in voltage across capacitor 58 is coupled through adding network 52 to the frequency control of oscillator 50 to maintain the relative phase of oscillators 50 and 51 constant at the value which exists 1.3 microseconds after each transmitted pulse. Substantially no phase shift develops between oscillators 50 and 51 during the .3 microsecond interval between the disabling of gate 75 and the enabling of gate 57, since capacitor 58 stores from the preceding pulse a voltage which makes the frequencies of oscillators 50 and 51 identical. Phase detector 54 keeps the phase shift of oscillator 50 constant relative to oscillator 51 from the period beginning 1.3 microseconds after a transmitted pulse until the next pulse is transmitted. Pulse generator 61 also disables gate 77 and enables gate 76 after the lapse of 1 microsecond from each transmitted pulse. However, this does not adversely affect the operation of mixer 21 for received signals, since the recovery time of the transmit-receive tube 12 will greatly exceed 1 microsecond and will most probably be of the order of magnitude of 5 microseconds, corresponding to a minimum range of .465 mile.

Phase detector 68 is provided to correct for any errors in the ground speed meter 72 when the system is mounted on an aircraft. The phase detector 68 is also used to compensate for target motion when the system is mounted on the ground and the radial velocity of targets is unknown. During the first half of each transmitted pulse, gate 48 is actuated so that capacitor 66 stores a voltage which tunes oscillator 67 approximately to the output frequency of mixer 20, which varies from 775 mc. to 825 mc. Oscillator 67 is synchronized precisely in frequency and phase by the output of mixer 20. Coherent oscillator 67 thus stores the phase of magnetron 10 and the local oscillator 51. Assume that the system is mounted on the ground. In such event, the target velocity meter 72 may comprise merely an adjustable potentiometer which may conveniently be set to provide zero voltage. Resolver 73 is no longer a required component; and the output of potentiometer 72 may be coupled directly into adding network 74. Assume, for the moment, that the target is a highly reflective aircraft and that hysteresis circuit 64 is manually adjusted to a level which prevents the passage of weak video signals and permits only the passage of the strong video signal from the reflective target. Further assume that variable delay network 62 is manually adjusted to maximum range corresponding to 500 microseconds, so that gate 65 will receive no inhibiting signal before the target pulse from detector 34 passes through hysteresis circuit 64. Finally, assume that the radial velocity of the aircraft is 100 meters per second which is .05 meter per pulse, which corresponds to 120° per pulse, and that at the time of reception of the first reflected pulse from the target aircraft the distance of the target and the phase of oscillator 50 are such that the output of phase detector 68 is zero. The first target pulse from detector 34 is coupled through hysteresis circuit 64 and gate 65 to actuate gate 70 and thus impress the output of detector 68 upon capacitor 71. Since the signal impressed upon capacitor 71 for the first reflected target pulse is zero, upon the second transmitted pulse the phase of oscillator 50 is not shifted relative to oscillator 51. When the second pulse is received, the output of phase detector 68 will be a voltage representing 120° of phase shift, corresponding to the target motion of .05 meter which has occurred between pulses. This voltage is stored in capacitor 71. It is desired that oscillator 50 be shifted in phase relative to oscillator 51 by an amount which is slightly in excess of the phase shift detected by phase detector 68. Accordingly, the gain with which the voltage across capacitor 71 is impressed upon adding circuit 74 may be such as to produce a frequency shift in oscillator 50 from 200 mc. of $\phi/330$ mc., where $\phi$ is the output of phase detector 68 in degrees. Upon the third transmitted pulse, oscillator 50 is phase-shifted through $120/330 = .364$ cycle $= 131°$. When the third target pulse is received, the total phase shift due to target motion between pulse is 240°; and the output of phase detector 68 will be $240 - 131 = 109°$. A voltage proportional to this output of phase detector 68 is again stored in capacitor 71. Upon the fourth transmitted pulse, oscillator 50 is phase-shifted through $109/330 = .331$ cycle $= 119°$; and the total phase shift is $131 + 119 = 250°$. When the fourth pulse is received, the total phase shift due to target motion is 360°; and the output of phase detector 68 will be $360 - 250 = 110°$. This output is stored in capacitor 71. The operation of the velocity compensating circuit is now stabilized, since upon the transmission of the fifth pulse, oscillator 50 will be phase-shifted through $110/330 = .333$ cycle $= 120°$, which is precisely the same as the phase shift due to target motion between pulses. When the fifth pulse is received, the output of phase detector 68 will again be 110°. Because the gain of the correction from phase detector 68 to phase shift in oscillator 50 is 12/11, the system will stabilize after four received pulses with an output from phase detector 68 which is 11/12 of the phase shift per pulse due to target motion.

It is desired that the gain of the correction from phase detector 68 to phase-shift in oscillator 50 be greater than unity so that phase detector 68 can provide phase corrections for oscillator 50 of up to ±180° without encountering the discontinuity in its own output which occurs at such phase angles. The fact that the gain of the correction is somewhat greater than unity produces a slight oscillation in reaching equilibrium. However, the system is fully stabilized after the first four pulses from a target are received.

If the system is mounted on the ground and the radial velocity of a moving target such as an aircraft is known or can be estimated by the rate of change of range, then a voltage corresponding to this value may be provided by adjustment of potentiometer 72. This voltage is directly coupled into adding network 74 to provide a first approximation to the necessary phase shift in oscillator 50 per pulse. Phase detector 68 will then provide outputs in accordance with the necessary residual correction for precise target motion compensation. Potentiometer 72 may then be manually or automatically re-adjusted until the compensating correction from capacitor 71 is zero. When this occurs, the setting of potentiometer 72 is then precisely equal to radial target velocity.

The precision velocity compensating outputs from phase detector 68 may be employed only for one target at a time within the azimuthal antenna beam width. If various targets are separated in azimuth, then they can all be tracked. However, only one target may be tracked for any given azimuthal orientation of the antenna. The target to be tracked may be isolated by amplitude, range, or a combination of both. If a plurality of reflecting targets lie along a given range line and the desired target provides the greatest video output, then such target can be isolated by merely increasing the voltage delay of hysteresis circuit 64 until only the video output of the desired target passes through.

If the desired target is at the greatest range, then it may be selected merely by adjusting hysteresis circuit 64 to eliminate weak ground return from greater ranges. All strong video pulses from the various reflecting targets will actuate gate 70. Capacitor 71 will be successively subjected to various voltages as the phase angles of the various targets will vary considerably. However, during a given range sweep, it is the last voltage stored by capacitor 71 which is effective to change the phase of oscillator 50. Thus the phase shift of oscillator 50 is governed by the most distant target.

If the desired target is neither the most distant nor the most intense, then targets more distant than the desired target may be eliminated by range gating. Network 62 is manually adjusted to provide a time delay somewhat less than that corresponding to the range of the first target which lies beyond the desired target. Flip-flop 63 will be set to inhibit gate 65 prior to the occurrence of a video output from such undesired target. Thus during a given range sweep, the last video pulse which can pass through gate 65 will be the desired target.

The various frequencies need not be precisely in phase at the midpoint of the composite pulse, since random or systematic phase variations of as much as ±20° can result at most in but a 6 percent reduction in the peak amplitude of the envelope. The output of sawtooth generator 42 is coupled to pulse generator 39 to reduce its normal period of .1 microsecond by as much as .005 microsecond. The purose of this is to compensate for systematic phase shifts in local oscillator 27 due to the rise time or time constant of its frequency control circuit. Assume that the rise time for frequency control of oscillator 27 is .01 microsecond. Assume further that oscillator 27 is synchronized to 725 mc. When gate 46 is disabled, the frequency changes from 725 mc. to 700 mc. during a rise time of .01 microsecond. The average frequency of oscillator 27 during this period is 712.5 mc. This advances the phase of oscillator 27 by 12.5(.01)=.125 cycle=45°. However, the input from sawtooth generator 42 through crystal 81 shortens the pulse duration of generator 39 by .005 microsecond. At the time gate 46 is disabled the phase of oscillator 27 is in retard of the phase it would have if the pulse duration of generator 39 were not shortened. This phase retardation is 25(.005)=.125 cycle=45° which precisely compensates for the phase advance of oscillator 27 due to the rise time of its frequency control. For the succeeding pulse, local oscillator 27 is synchronized to a frequency of 675 mc. When gate 46 is disabled, the frequency changes from 675 mc. to 700 mc. during a rise time of .01 microsecond. The average frequency of oscillator 27 during this period is 687.5 mc. This retards the phase of oscillator 27 by 12.5(.01)=.125 cycle=45°. However, the input from sawtooth generator 42 through crystal 82 again shortens the pulse duration of generator 39 by .005 microsecond from its normal .1 microsecond value. At the time gate 46 is disabled the phase of oscillator 27 is in advance of the phase it would have if the pulse duration of generator 39 were not shortened. This phase advance is 25(.005)=.125 cycle=45°, which precisely compensates for the phase retardation of oscillator 27 due to the rise time of its frequency control circuit. It will be noted that the pulse duration provided by generator 39 is shortened by an amount proportional to the absolute value of the deviation in magnetron frequency from 1000 mc., irrespective of whether this frequency deviation is positive or negative. It will be appreciated that if the frequency deviation is either +5 mc. or −5 mc., then the pulse duration of generator 39 will be shortened by .001 microsecond. It is only when the magnetron frequency is 1000 mc. that generator 39 provides its normal pulse period of .1 microsecond, since oscillator 27 will be synchronized to a frequency of 700 mc.; and no phase advance or retardation will occur due to the rise time of its frequency control circuit.

The output of discriminator 44 will comprise a stepwise variable sawtooth wave form similar to the continuous sawtooth wave form provided by generator 42. Low-pass filter 45 is provided to eliminate the sawtooth modulation component in the output of discriminator 44 and pass only the direct current component, which corresponds to any deviation of coherent oscillator 67 from an average frequency of 800 mc. This would occur if the average output frequency of magnetron 10 were to drift from 1000 mc. The output of low-pass filter 45 is coupled through adding network 43 to restore the average magnetron frequency to 1000 mc.

When my system is mounted on a moving aircraft and no prominent ground targets are available for precise velocity correction by phase detector 68, no substantial degradation in the peak amplitude of the envelope will occur even if the output of ground speed meter 72 is in error by 3 meters per second or approximately 6 miles per hour. An error of 3 meters per second in velocity corresponds to 3.6° per pulse for an average transmitted frequency of 1000 mc. During the course of eleven pulses, the total phase shift will be approximately 40°, which constitutes an error of ±20°. This systematic phase error will result in a degradation in the peak amplitude of the envelope by only 2 percent.

It will be recalled that phase detector 68 provides a fully stabilized precision velocity compensation after only four pulses. For the example given where the radial target velocity was 100 meters per second, corresponding to 120° per pulse, the sequential outputs of phase detector 68 were 0°, 120°, 109°, 110°, 110° . . . . It will be appreciated that after two pulses, the phase error from a final value of 110° is +10°, that after three pulses the phase error is −1°, and that after the fourth and succeeding pulses the phase error is substantially 0°. It will be seen then that only the first pulse received from a reflecting target will have a signficant phase error.

Hysteresis circuit 35 is provided so that differentiating circuit 36 provides an output only for the master pulse in recirculating delay line 26. The amplitude of the master pulse in delay line 26 is preferably at least twice the peak amplitude of pulses in recirculating delay line 26 corresponding to very close and highly reflective targets. Hysteresis circuit 35 should provide a voltage delay which appreciably exceeds the peak amplitude of the recirculating pulse from a most intense target but which is appreciably less than the amplitude of the master recirculating pulse.

Delay network 41 is provided to insure that retrace for sawtooth generator 42 occurs half-way between transmitted pulses. This creates equal positive and negative frequency deviations for the magnetron and further prevents the generation of any magnetron pulse during retrace of generator 42.

Thus far, we have assumed that magnetron 10 generates a square output pulse of .2 microsecond duration. In actuality, magnetron 10 may have a rise time of .075 microsecond and a similar decay time. In FIGURE 3, the broken line 3b shows the sloping leading edge of the magnetron pulse for a rise time of .075 microsecond. It will be noted that pulse generator 38 has a duration of only .125 microsecond, since the magnetron continues to provide energy output during its decay time of .075 microsecond. In FIGURE 3, the broken line 3c shows the terminal portion of the magnetron pulse. It will be seen that the magnetron pulse is of trapezoidal envelope with a flat-topped region of constant amplitude of only .05 microsecond duration. However, the magnetron pulse coupled to mixers 20 and 21 is of substantially square wave form because of the provision of limiter 18. Accordingly, the master pulse in recirculating delay line 26 will also have a substantially square leading edge. The fact that the magnetron pulse radiated from antenna 14 is of trapezoidal wave form does not diminish the peak amplitude of target pulses in the recirculating delay line, since the region of constant magnetron output entirely subtends the main lobe of the recirculating target pulse. As a matter of fact, the sloping leading and trailing edges of the magnetron pulse are desirable, since this tends to reduce the amplitudes of the various side lobes of recirculating target pulses from the values shown in FIGURES 2a and 4a. The trailing side lobes of the master recirculating pulse will not be attenuated from the values shown in FIGURE 3, since limiter 18 makes both the leading and trailing edges of the magnetron pulse applied to mixers 20 and 21 substantially rectangular. In FIGURE 3, the broken curve 3d shows the leading edge of a recirculating target pulse, which occurs at approximately .09 microsecond. Network 37 provides this time delay, so that the time interval between a reference pulse from network 37 and the leading edge of a video pulse from detector 34 will correspond to the range of a target.

The fact that the magnetron pulse is of trapezoidal waveform permits the frequency increment in transmitter output to be increased to 10 mc. For a transmitted pulse duration of .2 microsecond, the product of frequency step and pulse duration may thus be increased from one cycle to two cycles. If the transmitted magnetron pulse were of square waveform, then recirculating target pulses would exhibit additional peaks precisely at 0 microsecond and at .2 microsecond. However, since the magnetron pulse is of trapezoidal waveform, these extraneous peaks at the leading and trailing edges would be reduced in magnitude to small side lobes. Because of the provision of limiter 18, the master recirculating pulse of FIGURE 3 would exhibit another peak at .2 microsecond having an amplitude of 11. This peak at the trailing edge of the master recirculating pulse may be suppressed by providing an inhibiting gate between the output of delay line 26 and the input of detector 34 which is actuated for a period of .3 microsecond in response to the leading edge of the master recirculating pulse which passes through hysteresis circuit 35. It will be appreciated that the master recirculating pulse will not exhibit any peak at its trailing edge if the frequency increment in transmitter output is slightly reduced to 9 mc., for example, so that the product of frequency step and pulse duration is 1.8 cycles. The use of a large frequency step is desirable since the width of the main lobe of recirculating target pulses is decreased; and fewer sideband frequencies need be provided.

My system improves both range resolution and the accuracy of measuring range. Range resolution depends upon the length of the transmitted pulse. Accuracy of measuring range depends upon the steepness of the leading edge of the magnetron pulse. It will be seen from FIGURE 3 that for eleven transmitted frequencies my system increases range resolution by a factor of 6, because of the reduced width of the major lobe of recirculating pulses, and increases the accuracy of measuring range by a factor of 7, because of the increased steepness of the leading edge of the major lobe of recirculating pulses.

It will be seen that I have accomplished the objects of my invention. My system provides both high range accuracy and high range resolution. My system produces a composite target pulse of short rise time and short duration by successively transmitting different frequencies and combining the reflected signals in a recirculating delay line so that the various received frequencies are in phase at a predetermined instant of time. My system includes a correction circuit for substantially eliminating all systematic phase errors from stationary targets. My system further includes velocity compensation circuits for substantially reducing or completely eliminating phase error where relative motion exists.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A radar system including in combination means for periodically transmitting radar pulses, a recirculating line having a time delay equal to the period between successively transmitted pulses, means for successively changing the frequency of the pulses transmitted, means for receiving reflections of the transmitted pulses, means including phase shifting means for impressing received pulses upon the recirculating delay line to produce a composite recirculating pulse, and means for so controlling the phase shifting means that the various received frequencies are in substantial phase coincidence at a predetermined point of the composite recirculating pulse.

2. A radar system as in claim 1 in which the frequency changing means comprises means for successively changing the frequency of transmitted pulses in accordance with a sawtooth waveform.

3. A radar system as in claim 1 in which the transmitting means provides pulses having a certain time duration, in which the frequency changing means comprises means for successively changing the frequency of transmitted pulses by substantially equal increments, wherein the product of pulse duration and frequency increment is at least one cycle but not more than two cycles, and wherein said point is approximately the midpoint of the composite recirculating pulse.

4. A radar system including in combination means for periodically transmitting radar pulses having a certain time duration, a recirculating line having a time delay equal to the period between successively transmitted pulses, means for successively changing the frequency of the pulses transmitted, a first and a second mixer, means coupling the transmitting means to the first and second mixers, means coupling the recirculating delay line to the first mixer, a local oscillator, means coupling the second mixer to the recirculating delay line, means operable during an initial portion of each transmitted pulse for coupling the first mixer to the second mixer and for synchronizing the oscillator in both frequency and phase to the output of the first mixer, and means operable upon the termination of the initial portion of each transmitted pulse for restoring the oscillator to a predetermined constant frequency and for coupling the oscillator to the second mixer.

5. A radar system as in claim 4 which further includes means for introducing a master pulse of predetermined frequency into the recirculating delay line.

6. A radar system as in claim 4 wherein the transmitting means comprises means responsive to the recirculating delay line for controlling the time at which pulses are transmitted.

7. A radar system as in claim 4 in which the transmitting means comprises means responsive to the recirculating delay line and including a hysteresis circuit for controlling the time at which pulses are transmitted.

8. A radar system as in claim 4 in which the means coupling the transmitting means to the first and second mixers comprises a limiter.

9. A radar system as in claim 4 which further includes means responsive to the frequency changing means and operable during said initial portion of each transmitted pulse for tuning the oscillator to the output frequency of the first mixer.

10. A radar system as in claim 4 which further includes means for shortening said initial portion from a certain constant value by an amount proportional to the absolute value of the difference between the output frequency of the first mixer and said predetermined constant frequency of the oscillator.

11. A radar system including in combination a radar pulse transmitter, a transmit-receive device having a certain recovery time, a first and a second mixer, means coupling the transmitter to the first mixer and to the transmit-receive device, means coupling the transmit-receive device to the second mixer, a first and a second local oscillator each providing the same output frequency, means coupling the first oscillator to the first mixer, means coupling the second oscillator to the second mixer, and means operable upon each transmitted pulse for a period appreciably less than said recovery time for changing the frequency of the second oscillator from equality with that of the first oscillator.

12. A radar system as in claim 11 in which the frequency changing means comprises means for changing the frequency of the second oscillator by an amount proportional to the relative radial velocity between the system and a radar target.

13. A radar system as in claim 11 wherein the first and second oscillators have a certain value of relative phase shift upon the termination of each period, the system further including means operable after the termination of each period and responsive to changes in relative phase shift from said certain value for adjusting the frequency of the second oscillator.

14. A radar system as in claim 11 which is mounted on a moving craft having a heading axis, the system further including an antenna, means for moving the antenna in azimuth, means for providing a signal in accordance with the velocity of the craft along its heading axis, a resolver, means for driving the resolver synchronously with azimuthal motion of the antenna, means for impressing the velocity signal upon the resolver, the resolver providing an output in accordance with the product of the velocity of the craft and the cosine of the angle between the antenna and the heading axis, wherein the frequency changing means for the second oscillator comprises the resolver output.

15. A radar system including in combination a radar pulse transmitter, a transmit-receive device, a first and a second mixer, means coupling the transmitted to the first mixer and to the transmit-receive device, means coupling the transmit-receive device to the second mixer, a first and a second local oscillator each providing the same output frequency, a third local oscillator, means coupling the first oscillator to the first mixer, means coupling the second oscillator to the second mixer, means responsive to the first mixer for synchronizing the third oscillator in both frequency and phase, a phase detector providing an output, means coupling the second mixer and the third oscillator to the phase detector, a storage device, means for gating the output of the phase detector to the storage device, and means operable upon each transmitted pulse for a certain period and responsive to the storage device for changing the frequency of the second oscillator from equality with that of the first oscillator.

16. A radar system as in claim 15 wherein the output of the phase detector represents a certain phase shift between the outputs of the second mixer and the third oscillator and wherein the frequency changing means comprises means for changing the frequency of the second oscillator by an amount such that the frequency change during said period produces a change in phase of the second oscillator relative to the first oscillator which exceeds said certain phase shift.

17. A radar system as in claim 15 which further includes means for receiving reflections of transmitted pulses and means responsive to received pulses exceeding a predetermined amplitude for actuating the gating means.

18. A radar system as in claim 15 which further includes means for receiving reflections of transmitted pulses, means responsive to received pulses for actuating the gating means, and means for inhibiting the actuation of the gating means for pulses received from beyond a predetermined distance.

References Cited

UNITED STATES PATENTS

| | | | |
|---|---|---|---|
| 2,555,121 | 5/1951 | Emslie | 343—7.7 |
| 2,740,963 | 4/1956 | Shuler et al. | 343—7.7 X |
| 3,196,437 | 7/1965 | Mortley et al. | 343—17.2 |

RICHARD A. FARLEY, *Primary Examiner.*

C. L. WHITHAM, *Assistant Examiner.*